(12) United States Patent
Giefer et al.

(10) Patent No.: US 8,636,130 B2
(45) Date of Patent: Jan. 28, 2014

(54) PARKING BRAKE DEVICE FOR MOTOR VEHICLE TRANSMISSIONS

(75) Inventors: Andreas Giefer, Lemförde (DE); Jörg Meyer, Wagenfeld (DE); Ludger Rake, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1022 days.

(21) Appl. No.: 12/438,641

(22) PCT Filed: Aug. 7, 2007

(86) PCT No.: PCT/DE2007/001397
§ 371 (c)(1),
(2), (4) Date: Feb. 24, 2009

(87) PCT Pub. No.: WO2008/022617
PCT Pub. Date: Feb. 28, 2008

(65) Prior Publication Data
US 2009/0321215 A1 Dec. 31, 2009

(30) Foreign Application Priority Data
Aug. 25, 2006 (DE) .......................... 10 2006 039 862

(51) Int. Cl.
*B60T 1/00* (2006.01)
(52) U.S. Cl.
USPC ..................................................... 192/219.5
(58) Field of Classification Search
USPC ..................................................... 192/219.5
See application file for complete search history.

(56) References Cited

U.S. PATENT DOCUMENTS

| | | | | |
|---|---|---|---|---|
| 2,974,752 A * | 3/1961 | Howard | ........................ | 188/69 |
| 3,704,757 A * | 12/1972 | Buress, III | .................. | 180/6.48 |
| 5,402,870 A * | 4/1995 | Osborn | ..................... | 192/220.7 |
| 5,759,132 A * | 6/1998 | Osborn et al. | .................. | 477/96 |
| 5,954,179 A | 9/1999 | Osborn | | |
| 6,125,983 A | 10/2000 | Reed, Jr. et al. | | |
| 2002/0092710 A1 | 7/2002 | Oppitz et al. | | |
| 2004/0187620 A1* | 9/2004 | Newman et al. | ............. | 74/411.5 |
| 2004/0237694 A1 | 12/2004 | Lindenschmidt et al. | | |

FOREIGN PATENT DOCUMENTS

| | | |
|---|---|---|
| DE | 43 22 523 A1 | 1/1995 |
| DE | 198 18 863 C1 | 11/1999 |
| DE | 198 20 920 A1 | 11/1999 |
| DE | 198 34 156 A1 | 2/2000 |
| DE | 102004021981 | 11/2004 |

(Continued)

*Primary Examiner* — David D Le
*Assistant Examiner* — Ryan Dodd
(74) *Attorney, Agent, or Firm* — McGlew and Tuttle, P.C.

(57) ABSTRACT

A parking brake device for motor transmissions, especially automatic transmissions has a parking brake pawl (2) with an actuating or adjusting device (3) for engaging and disengaging the pawl (2) as well as a holding device for securing the parking brake pawl (3) in the disengaged position. The holding device includes a toggle mechanism (6, 7, 8, 9) that can be brought from a first, stretched position, in which the parking brake pawl (2) is fixed in the disengaged position, into a second, bent position, in which the parking brake pawl (2) can be engaged. This presents a reduction of the design effort, an improvement of robustness and resistance to different ambient conditions with no auxiliary energy requirement for maintaining the securing action for the parking brake pawl and also minimal releasing forces for releasing the parking brake securing.

20 Claims, 2 Drawing Sheets

(56) References Cited

FOREIGN PATENT DOCUMENTS

| | | |
|---|---|---|
| DE | 698 25 935 T2 | 1/2005 |
| DE | 102004030006 | 1/2006 |
| DE | 102005002446 | 7/2006 |
| EP | 0 625 656 A1 | 11/1994 |
| JP | 11-037290 A | 2/1999 |
| JP | 2001-510114 T | 7/2001 |
| WO | 99/03696 A2 | 1/1999 |
| WO | 2005/124197 | 12/2005 |

* cited by examiner

- Prior Art -       - Prior Art -

- Prior Art -

- Prior Art -

PARKING BRAKE DEVICE FOR MOTOR VEHICLE TRANSMISSIONS

CROSS REFERENCE TO RELATED APPLICATIONS

This application is a U.S. National Phase application of International Application PCT/DE2007/001397 and claims the benefit of priority under 35 U.S.C. §119 of German Patent Application DE 10 2006 039 862.9 filed Aug. 25, 2006, the entire contents of which are incorporated herein by reference.

FIELD OF THE INVENTION

The present invention pertains to a parking brake device for a motor vehicle transmission, especially for an automatic transmission parking with the brake device including a parking brake pawl with an adjusting means for engaging and disengaging the pawl, as well as a holding means for securing the parking brake pawl in the disengaged position.

BACKGROUND OF THE INVENTION

Parking brakes are used whenever non-mechanical components are used in a powertrain, especially in automatic transmissions with hydrodynamic torque converters.

Motor vehicles with automatic transmission are thus usually equipped with a parking brake in order to prevent the vehicle from rolling unintendedly away when the vehicle is stopped and the engine is turned off. The parking brake now blocks the transmission power take-off shaft connected to the driving wheels in such a way that they rotate in unison as a consequence of an actuating signal initiated by the driver, for example, by a pawl arranged in the automatic transmission being caused to mesh with the teeth of the parking brake wheel arranged on the transmission power take-off shaft.

Many different mechanical, electrohydraulic as well as electromechanical systems are known as transmission means between such a parking brake, designed, for example, as a pawl, and the actuating device of the parking brake, which said actuating device is arranged in the passenger compartment of the motor vehicle. Mechanical transmission means for actuating the parking brake comprise, for example, a Bowden cable between the selector lever arranged in the passenger compartment and the transmission control arranged at the automatic transmission.

To improve the possibilities of design embodiment of the free arrangement of the actuating device in the passenger compartment and nevertheless to also guarantee an acoustic uncoupling of the actuating device from the powertrain of the motor vehicle, there has increasingly been a shift in modern motor vehicles or automatic transmissions to the shift-by-wire principle, especially because modern automatic transmissions are also increasingly controlled fully electronically.

There usually is no mechanical connection whatsoever any more between the actuating element in the passenger compartment and the gearbox itself in such "shift-by-wire" transmissions. The shift command is rather transmitted from the actuating means or from the selector lever of the automatic transmission mostly exclusively by means of electrical or electronic signals.

Concerning the parking brake, this means, in other words, that the transmission means provided for actuating the parking brake between the selector lever and the adjusting means of the parking brake, by which means the motion of the pawl is brought about, is preferably also designed as a purely electrical or electronic signal connection.

However, independently from the actual design of the transmission means, it is required in all parking brake systems that unintended engaging of the parking brake, for example, as a consequence of failure of hydraulic or electrical components, be avoided during driving. The parking brake shall consequently be engaged with certainty only when the lever position P is actually engaged on the selector lever or when—as is present in some automatic transmissions—the P button was pressed or when—for example, after the driver has left the motor vehicle—the parking brake was possibly engaged automatically.

DE 43 22 523 A1 discloses an electrohydraulic control means for a motor vehicle automatic transmission with a functional connection designed as an electrical connection between the actuating means of the automatic transmission in the interior space of the vehicle and the electrohydraulic transmission control, in which the different gears of the automatic transmission are engaged by admitting pressure to electrohydraulic shifting members in the transmission control, whereas shift position P is engaged by depressurizing all shifting members. The arrangement described in this document consequently leads at first to the circumstance that the parking brake is engaged when pressure is eliminated not only in shift position P of the automatic transmission but also in all gears of the selector lever.

The parking brake is engaged here via a spring-type brake actuator, while the parking brake is disengaged hydraulically via the oil pressure circuit of the automatic transmission. To avoid unintended engagement of the parking brake when, e.g., there is a defect in the transmission oil supply when the selector lever is not engaged in shift position P, an additional control means is provided, which is controlled by the selector lever by means of a Bowden cable and prevents the parking brake from becoming engaged via the spring-type brake actuator until the selector lever is brought into shift position P.

DE 198 34 156 A1 describes a parking brake for a motor vehicle automatic transmission, in which the pawl of the parking brake is likewise engaged by means of a spring-type brake actuator and is released by hydraulic pressure from the oil pressure circuit of the automatic transmission, while the spring-type brake actuator is prestressed at the same time. To prevent the parking brake from engaging unintendedly when the hydraulic pressure is lost, a mechanical ball locking mechanism of the hydraulic parking brake actuation is provided, which is actuated via an electromagnet. As long as the electromagnet is energized, the ball locking mechanism is held in the locked position, so that the parking brake remains in the released position. If the selector lever is brought into shift position P, the electromagnet is switched off, as a result of which the ball locking mechanism is released, which in turn leads to the engagement of the parking brake by means of the prestress of the spring-type brake actuator.

DE 10 2004 030 006 A1 shows a parking brake device, in which the parking brake pawl is likewise engaged by means of a spring-type brake actuator and is again released by hydraulic pressure from the oil pressure circuit of the automatic transmission while the spring-type brake actuator is compressed at the same time. To avoid unintended engaging of the parking brake when the hydraulic pressure is possibly lost, a mechanical pawl holder is actuated by energizing an electromagnet. As long as the electromagnet is not energized, the pawl holder is held in the released position, so that the parking brake remains in the released position. If the electromagnet is energized, the pawl holder is released, and the parking brake is engaged because of the prestress of the spring-type brake actuator.

However, the devices known from the state of the art for the electromagnetic or mechanical securing of the parking brake pawl in the disengaged position for the case of loss of hydraulic pressure, especially the electromagnetically secured ball holders as well as the electromagnetically released pawl holders, are complicated and therefore cost-intensive in terms of design and production. These are demanding precision mechanical assembly units, which require a very precise coordination and dimensional accuracy of the components and are, moreover, sensitive to different ambient conditions, and such holding means therefore also need to be arranged in an especially protected manner.

SUMMARY OF THE INVENTION

Against this background, the object of the present invention is consequently to provide a parking brake device with a holding means for securing the parking brake pawl, with which the said drawbacks present in the state of the art can be overcome. The present invention shall, in particular, make it possible to reduce the great design effort associated with the parking brake device or the holding means and the costs resulting herefrom. Furthermore, the holding means shall be robust and comparatively insensitive to ambient conditions, and the holding means shall permit flexible arrangement in or at the motor vehicle transmission or in the environment of the motor vehicle transmission.

The parking brake device comprises according to the present invention a parking brake pawl with an adjusting means. The adjusting means is used to engage and disengage the parking brake pawl. In a likewise known manner, the parking brake device comprises, furthermore, a holding means for securing the parking brake pawl in the disengaged position. The holding means thus ensures that no unintended engagement of the parking brake will take place, for example, as a consequence of a pressure drop in the hydraulic system of the transmission, as long as the selector lever has not been shifted into position P. The parking brake device according to the present invention has a holding means comprising a toggle mechanism. The toggle mechanism can be brought from a first, stretched position, in which the parking brake pawl is fixed by the toggle mechanism in the disengaged position, into a second position, in which the toggle mechanism is angulated, and in which the parking brake pawl can engage the parking brake wheel in a spring-loaded manner.

This is advantageous because the parking brake remains stable and permanently disengaged in this manner especially when the hydraulic oil pressure is possibly lost, without it being necessary for this, for example, to supply an actuator with power, for example, to supply an electromagnet with power, as this is the case in some of the state of the art cited. Furthermore, release of the holding means and the subsequent engagement of the parking brake can be brought about even by means of minimal forces thanks to the toggle mechanism used according to the present invention, so that large and hence correspondingly expensive and bulky actuator means are not necessary for releasing the holding means. This is linked especially with the fact that the angulation of the toggle lever of the toggle mechanism and the subsequent collapse of the holding action of the toggle mechanism in the initial stretched position of the toggle lever can already take place by means of minimal releasing forces of, e.g., a small electromagnet.

Furthermore, the toggle mechanism used according to the present invention has the advantage of having an especially reliable and robust function, because the requirements imposed on the dimensional accuracy of the components are considerably less exacting in case of the toggle mechanism than in the ball or pawl holders known from the state of the art. A toggle mechanism is also less dependent on the friction conditions and is therefore also considerably more insensitive to different ambient conditions, e.g., lubrication conditions, contamination or moisture and the like. This leads to both improved, robust and reliable function of the holding means and an increase in the freedom of design and arrangement of the holding means or of the toggle mechanism compared to the state of the art.

On the whole, a simpler, more robust, less expensive and more reliable design of the holding means of a parking brake device is achieved as a consequence of the claimed use of the toggle mechanism.

The present invention can be embodied regardless of how the toggle mechanism is arranged and is especially geometrically dimensioned as long as the holding forces necessary to secure the parking brake pawl in the disengaged position can be reliably transmitted. However, according to a preferred embodiment of the present invention, the toggle mechanism is at least slightly overstretched in its first position, in which the parking brake pawl is fixed by the toggle lever in the disengaged position. In other words, this means that not only are the legs of the toggle lever arranged along a common straight line in the first position of the toggle mechanism, but the legs of the toggle mechanism are also at least slightly overstretched in this first position of the toggle mechanism in the range from a few angular minutes to a few angles.

The toggle mechanism is thus subject to a stabilizing action in relation to its first position, in which the parking brake pawl is secured against unintended engagement of the parking brake wheel, for example, as a consequence of the spring force of the spring-type brake actuator used to engage the parking brake. Thus, only the slight overstretching of the toggle lever as well as a very slight restoring force, which results herefrom, are to be overcome to transfer the legs of the toggle mechanism from the first, stretched position into the second, angulated position, in which the parking brake pawl can engage. The angulation or collapse of the holding force of the toggle mechanism will subsequently take place immediately.

How the motion of the legs of the toggle lever from the first, stretched or overstretched position into the second, bent position is initiated is at first irrelevant according to the present invention. Thus, it is conceivable, for example, that an impulse is transmitted for this in a purely mechanical way to the toggle joint point of the toggle mechanism, for example, by a Bowden cable connected to the selector lever or by a corresponding actuating linkage. According to another embodiment of the present invention, the parking brake device does, however, comprise an actuator element for deflecting the toggle mechanism from the first state thereof, after which the angulation or collapse of the holding action of the toggle mechanism can take place.

This embodiment is especially advantageous in respect to use in fully actuator-shifted transmissions, i.e., especially in motor vehicle transmissions that are shifted according to the shift-by-wire principle solely by the transmission of electrical or electronic control signals.

Against this background, provisions are made according to another, especially preferred embodiment of the present invention for the actuator element to be a solenoid or an electromagnet. This embodiment has the advantage that it can be designed as a compact and space-saving embodiment, and, furthermore, a solenoid or electromagnet can be arranged very much as desired. Thanks to the toggle mechanism used according to the present invention, a very small and lightweight electromagnet is sufficient, which has a minimal power consumption and hence also offers advantages in terms of cost-effective production and mounting.

Contrary to some of the state of the art cited in the introduction, permanent supply of power to the electromagnet is not, moreover, necessary in a parking brake device thus equipped in order to secure the parking brake in the disengaged position, and the power consumption associated therewith in the state of the art is therefore eliminated as well. In addition, additional safety is obtained against undesired engagement of the parking brake in case of a defect in the power supply of the electromagnet and if there is no hydraulic pressure at the same time.

The present invention can be embodied regardless of where the holding means or the toggle mechanism is arranged. However, the use of a toggle mechanism according to the present invention already makes it possible to select the site of installation in an especially flexible manner based on the nonsusceptibility of the toggle mechanism to the ambient conditions and based on the mechanical robustness of the toggle mechanism.

Against this background, provisions are made according to another embodiment of the present invention for the holding means or the toggle mechanism to be able to be connected directly to a gearshift shaft. The adjusting means for engaging and disengaging the parking brake pawl is actuated here by the gearshift shaft in a manner known per se. The toggle mechanism may be optionally arranged here both inside the transmission housing and outside the transmission housing. Based on this flexibility of the arrangement of the holding means or the toggle mechanism, the more complicated solutions known from the state of the art can be replaced with the parking brake device according to the present invention, which is of a simpler design and can be used in a flexible manner.

According to an alternative embodiment of the present invention, the holding means or the toggle mechanism can be connected to the adjusting means of the parking brake pawl via a cable or a coupling linkage. An even greater freedom of construction is thus obtained concerning the design and arrangement of the toggle mechanism.

According to other, preferred embodiments of the present invention, the adjusting means for actuating the parking brake pawl comprises a hydraulic actuator element, and the hydraulic actuator element is preferably acted on by a spring in the form of a spring-type brake actuator in the direction of the engaged parking brake pawl. The hydraulic actuator element is set up such that when hydraulic oil pressure is admitted, the parking brake pawl is disengaged from the parking brake wheel. These embodiments are especially advantageous in connection with the toggle mechanism used according to the present invention, because active disengagement of the parking brake pawl can be performed in this manner without problems by means of auxiliary energy when hydraulic oil pressure is present, i.e., with the engine running. By contrast, the parking brake can also be engaged without hydraulic oil pressure because of the spring action of the hydraulic actuator element in the interest of safety. Thus, the parking brake pawl can still be engaged without problems by the spring-type brake actuator even in case of a possible failure of the hydraulic system.

The present invention will be explained in more detail below on the basis of the drawings. These show exemplary embodiments only. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figures 1, 2:
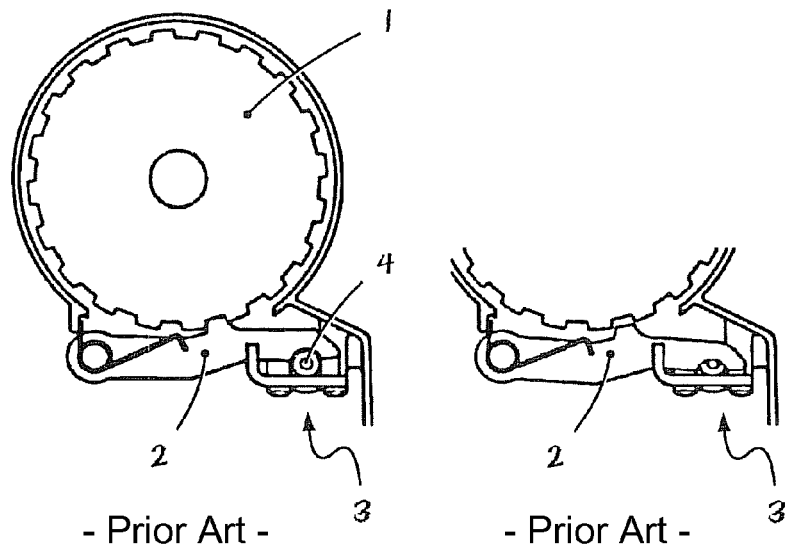
FIG. 1 is a schematic view of the parking brake wheel and parking brake pawl and actuating or adjusting means used with a parking brake device according to the state of the art and shown in the engaged position of the parking brake and which parking brake wheel and parking brake pawl and actuating or adjusting means is also used in combination with features according to the invention.
FIG. 2 is the parking brake wheel and the parking brake pawl according to FIG. 1 in the disengaged position of the parking brake in a representation and view corresponding to FIG. 1.

FIGS. 1 and 2 show schematic views of the parking brake wheel 1 and the parking brake pawl 2 of a parking brake device according to the state of the art. FIG. 1 shows the parking brake pawl 2 in the engaged position, in which the parking brake wheel 1 and hence the powertrain is fixed in its rotation, whereas the parking brake pawl 2 is disengaged in FIG. 2, so that the parking brake wheel 1 and the powertrain of the vehicle can rotate freely. The parking brake pawl 2 is actuated by an adjusting means 3 with an actuating slide and a cone 4, which is visible in the form of a suggestion in FIGS. 1 and 2, the direction of motion of the actuating slide and cone 4 extending at right angles to the drawing plane.

The motion of the actuating slide and hence the engagement and disengagement of the parking brake pawl 2 are in turn brought about by an actuator, which is not shown in the figures and is set up such that the parking brake is disengaged when the actuator is activated and is engaged in case of deactivation or absence of force acting on the actuator by means of a spring load applied by a spring-type brake actuator (not shown). However, to prevent the parking brake from being engaged unintendedly in case of a possible failure of the actuator, for example, in case of loss of the hydraulic pressure in case of a hydraulically actuated actuator, even though the vehicle has not, for example, come to a stop yet or even though the gear selector lever is not in position P, such parking brake device require an additional holding means for securing the parking brake pawl in the disengaged position.

Figure 3:
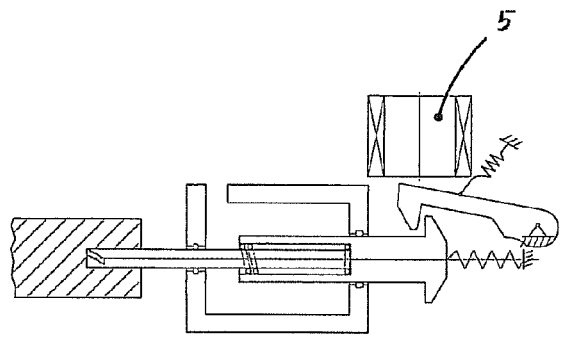
FIG. 3 is a holding means for a parking brake pawl according to the state of the art in a schematic sectional view.
Figure 4:
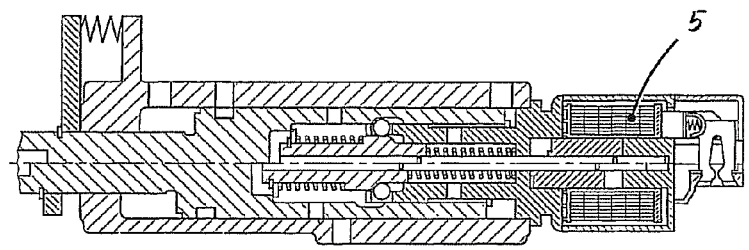
FIG. 4 is another holding means for a parking brake pawl according to the state of the art in a representation and view according to FIG. 3.

Such holding means known from the state of the art for securing the parking brake pawl in the disengaged position are shown, for example, in FIGS. 3 and 4. The holding means shown in FIG. 3 in a highly schematic form only is an electromagnetically actuated locking pawl, whereas FIG. 4 shows a likewise electromagnetically actuated ball lock.

It is seen that the holding means for securing the parking brake pawl in the disengaged position, which are shown in FIGS. 3 and 4 and are known from the state of the art, are in the form of comparatively complicated mechanisms, which comprise a plurality of individual parts, whose dimensions must be exactly coordinated with one another. However, such prior-art holding means for securing the parking brake pawl lead to considerable manufacturing costs and are comparatively sensitive and susceptible to different ambient conditions because of their complexity, and well-protected arrangement and a corresponding lubricant supply are therefore always absolutely necessary in the holding means known from the state of the art.

The holding means known from the state of the art, as they are shown, for example, in FIGS. 3 and 4, do, moreover, require comparatively powerful electromagnets 5, which consequently tend to have a large volume, and which also have a considerable power consumption. This applies especially to the holding means according to FIG. 4, in which the electromagnet 5 must be permanently supplied with power to fix or secure the parking brake pawl in the disengaged position. The securing of the parking brake pawl is abolished there only when the operating current of the electromagnet 5 is switched off, and the parking brake can move into the locked position. In other words, this means that, for example, in case of the holding means according to FIG. 4, a permanent exciting current must flow to secure the locking pawl in the open position, which may lead to a load on the battery of the vehicle especially when the engine had been stopped and the parking brake is not yet engaged.

Figure 5:
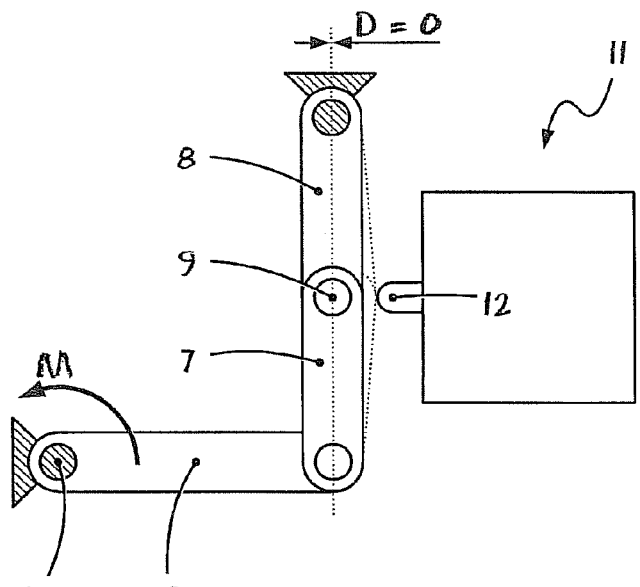
FIG. 5 is a holding means of one embodiment for a parking brake device according to the present invention in the blocked position in a schematic view.
Figure 6:
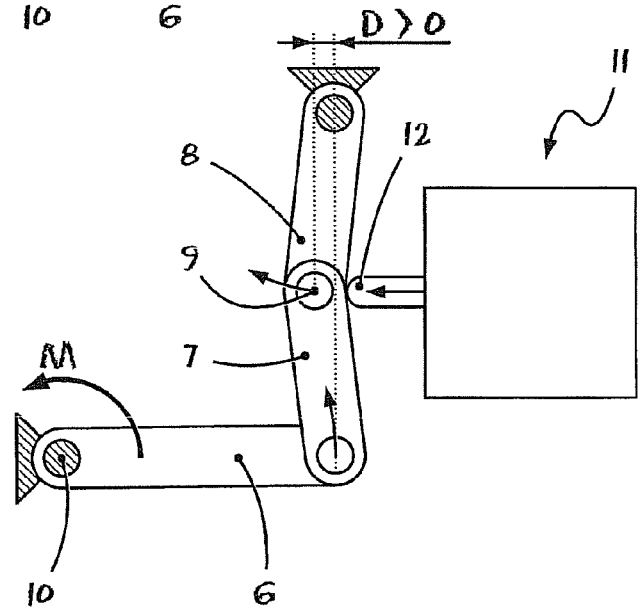
FIG. 6 is the holding means according to FIG. 5 at the time of passage from the blocked position into the released position in a representation and view corresponding to FIG. 5.
Figure 7:
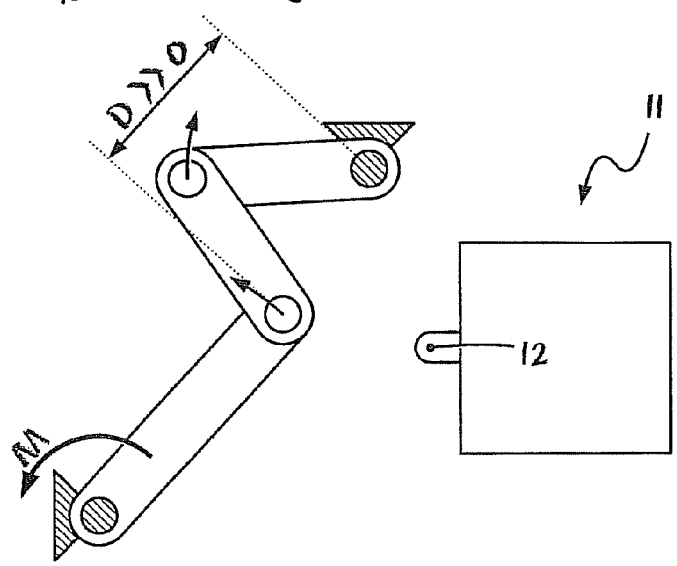
FIG. 7 is the holding means according to FIGS. 5 and 6 in the released position in a representation and view corresponding to FIGS. 5 and 6.

However, these limitations, which can still be found in the state of the art in the area of the holding means for the parking brake pawl, can be eliminated nearly completely as a consequence of the present invention, as this is apparent from FIGS. 5 through 7. FIGS. 5 through 7 show the holding means for the parking brake pawl in the embodiment of the parking brake device according to the present invention in a highly schematic view. FIG. 5 shows the holding means in the locked position, FIG. 6 shows the holding means at the time of passage from the locked position into the released position, and FIG. 7 shows the holding means in the released position, in which the securing of the parking brake pawl is finally abolished in the disengaged position.

FIGS. 5 through 7 show the toggle mechanism, which is composed of the actuating lever 6, the connection leg 7 and the support leg 8. The connection leg 7 and the support leg 8 form, together with the knee point 9, which movably couples the connection leg 7 and the support leg 8, the toggle lever 7, 8, 9 proper. The actuating lever 6 acts, by contrast, on an adjusting means 3 (not shown in FIGS. 5 through 7 but shown in FIGS. 1 and 2), with which the parking brake pawl 2 can be moved to and fro between the disengaged and engaged positions, cf., e.g., the adjusting means 3 indicated in FIGS. 1 and 2. The actuating lever 6 may, furthermore, also be connected directly to a gearshift shaft 10, by which the adjusting means 3 is in turn actuated and the parking brake pawl 2 is therefore engaged.

In other words, this means that the parking brake pawl 2 is fixed or secured by means of the adjusting means 3 in the disengaged position in the position of the toggle mechanism 6, 7, 8, 9, which position is shown in FIG. 5, as a consequence of the horizontal blocked position of the actuating lever 6 in the drawing. The parking brake wheel 1 and powertrain are thus freely movable in terms of rotation in the position of the toggle mechanism 6, 7, 8, 9 shown in FIG. 5.

To engage the parking brake, the adjusting means must, by contrast, be actuated such that the securing against unintended engagement of the parking brake pawl 2 is released, after which the parking brake pawl 2 can be engaged, for example, by the spring pressure of the spring-type brake actuator. This actuation of the adjusting means in terms of the engagement of the parking brake pawl takes lace in this embodiment of the holding means according to the present invention as is shown in FIG. 6.

The holding means comprises for this a small electromagnet 11 or a solenoid 11 with an actuating pin 12, which can be disengaged electromagnetically. Thus, when the electromagnet 11 is supplied with power, the actuating pin 12 extends and deflects the knee point 9 of the toggle mechanism 6, 7, 8, 9 from the stretched position of the toggle lever 7, 8, 9 according to FIG. 5 in the direction of a bend of the toggle lever 7, 8, 9 according to FIG. 6. Since the actuating or holding forces exerted by the toggle mechanism 6, 7, 8, 9 on the actuating lever 6 and hence on the adjusting means 3 of the parking brake locking mechanism have no effective lever arm D in respect to the knee point 9 of the toggle lever in the stretched position of the toggle lever 7, 8, 9, the deflection of the knee point 9 can thus be brought about by very weak forces. The holding means according to the present invention can therefore also be used with a comparatively small and low-power electromagnet 11 requiring a small space for its installation and having a low power consumption.

However, a rapidly increasing lever arm D develops in respect to the actuating forces or holding torques M acting on the toggle lever 7, 8, 9 from the adjusting means 3 or the gearshift shaft 10 as a reaction following the initial deflection of the knee point 9 from the stretched position of the toggle lever 7, 8, 9 according to FIG. 5 into the bent position according to FIG. 6, cf. the approximate view of the increase in lever arm D at the time of transition of the toggle lever position between FIGS. 5, 6 and 7. However, this means that the electromagnet 11 is needed only for the initial deflection of the toggle lever 7, 8, 9 from the stretched position thereof according to FIG. 5 into a slightly bent position according to FIG. 6. The further deflection of the toggle lever 7, 8, 9 or the subsequent collapse of the holding action of the toggle mechanism 6, 7, 8, 9 subsequently take place automatically based on the actuating forces or holding torques M acting as a reaction from the adjusting means on the toggle lever 7, 8, 9 via the gearshift shaft 10 and based on the rapidly increasing lever arm D.

Due to an initially slight overstretching of the toggle lever 7, 8, 9 in the position of the holding means according to FIG. 5 (i.e., by means of an inoperative position of the knee point 9 slightly shifted in the direction of the electromagnet, as is indicated by dotted line in FIG. 5 in the form of a suggestion), the stability of the locked position according to FIG. 5 can be additional improved without substantial magnetic forces being necessary for this case to deflect the knee point 9 from the holding position according to FIG. 5. Even better stability of the holding means is obtained in this manner against external effects, especially shocks and the like.

Thus, it becomes clear as a result that a parking brake device for motor vehicle transmissions, which has advantages over the state of the art, especially in terms of a reduction of the design effort associated with the securing means as well as in terms of the improvement of robustness and concerning reduced susceptibility to ambient conditions, is created with the present invention. Furthermore, the securing means of the parking brake pawl can be arranged in an especially flexible manner in the motor vehicle transmission or in the environment of the motor vehicle transmission thanks to the present invention. In addition, the parking brake device according to the present invention requires no auxiliary energy for maintaining the securing action for the parking brake pawl, and only a minimal releasing force is needed for releasing the parking brake securing.

Thus, the present invention makes an important contribution to the improvement especially of cost effectiveness, while the space needed for installation is reduced at the same time and robustness is improved in the design and manufacture of parking brake device for motor vehicle transmissions, especially in case of use for cost-conscious applications in the area of automatic transmissions.

While specific embodiments of the invention have been shown and described in detail to illustrate the application of the principles of the invention, it will be understood that the invention may be embodied otherwise without departing from such principles.

The invention claimed is:

1. A parking brake device for motor vehicle automatic transmissions, said parking brake device comprising:
   a parking brake pawl;
   an adjusting means for engaging and disengaging the pawl;
   a holding means for securing the parking brake pawl in the disengaged position, said holding means comprising a toggle mechanism, said toggle mechanism comprising an area of articulation, wherein the toggle mechanism can be brought from a first, stretched position, in which the parking brake pawl is fixed in the disengaged position, into a second, bent position, in which the parking brake pawl can be engaged; and
   an actuator element for deflecting the toggle mechanism from the first position, said actuator element being located at a spaced location from said toggle mechanism, said actuator element comprising an actuating pin, said actuating pin being movable between an extended position and a retracted position, said actuating pin being located at a spaced location from said toggle mechanism in said retracted position, said actuating pin having a first operating length in said retracted position, said actuating pin being temporarily activated such that said actuating pin engages at least a portion of said articulation area in said extended position and said actuating pin returns to said retracted position upon said actuating pin engaging said articulation area, said actuating pin having a second operating length in said extended position, said second length being greater than said first operating length.

2. A parking brake device in accordance with claim 1, wherein the toggle mechanism is at least slightly over-stretched in said first position.

3. A parking brake device in accordance with claim 1, wherein the actuator element is a solenoid or electromagnet, said actuating pin moving, independent of movement of said toggling mechanism, between said retracted position and said extended position, said toggling mechanism being in said second, bent position with said actuating pin in said retracted position.

4. A parking brake device in accordance with claim 1, wherein the holding means can be directly connected to a gearshift shaft.

5. A parking brake device in accordance with claim 1, wherein said holding means can be connected to the adjusting means of the parking brake pawl via a cable or coupling linkage.

6. A parking brake device in accordance with claim 1, wherein the adjusting means of the parking brake device comprises a hydraulic actuator element, wherein the hydraulic actuator element is set up to disengage the parking brake pawl when oil pressure is admitted.

7. A parking brake device in accordance with claim 6, wherein a spring force is applied to the hydraulic actuator element by means of a spring-type brake actuator in the direction of the engaged parking brake pawl.

8. A parking brake device for motor vehicle automatic transmissions, the parking brake device comprising:
   a parking brake pawl arrangement with a parking brake wheel, which when fixed, fixes a vehicle power train, a parking brake pawl movable between an engaged position, engaging the parking brake wheel to fix the parking brake wheel and a disengaged position and an adjusting means for engaging and disengaging the pawl from said parking brake wheel;
   a holding means for securing the parking brake pawl in the disengaged position, said holding means comprising a toggle mechanism having a first toggle mechanism portion and a second toggle mechanism portion that can be brought from a first, stretched position, in which the parking brake pawl is fixed in the disengaged position, into a second, bent position, in which the parking brake pawl can be engaged, said first toggle mechanism portion being pivotably connected to said second toggle mechanism portion, said first toggle mechanism portion and said second toggle mechanism portion defining a point of articulation; and
   an actuator element deflecting the toggle mechanism from the first, stretched position to the second, bent position, said actuator element comprising an actuating pin, said actuating pin being movable between a retracted position and an extended position, said actuating pin being at a spaced location from said toggle mechanism in said retracted position, wherein said actuating pin is disconnected from said toggle mechanism in said retracted position, said actuating pin being temporarily activated such that said actuating pin engages one or more of said first toggle mechanism portion and said second toggle mechanism portion in an area of said point of articulation in said extended position and said actuating pin moves to said retracted position upon said actuating pin engaging said one or more of said first toggle mechanism portion and said second toggle mechanism portion.

9. A parking brake device in accordance with claim 8, wherein the toggle mechanism is at least slightly over-stretched in said first position, said actuating pin having a first operating length in said retracted position, said actuating pin having a second operating length in said extended position, wherein said first operating length is less than said second operating length.

10. A parking brake device in accordance with claim 8, wherein the actuator element is a solenoid or electromagnet, said actuating pin moving independently from said toggling mechanism, wherein said actuating pin moves between said retracted position and said extended position, relative to said toggling mechanism, via said actuator element.

11. A parking brake device in accordance with claim 8, wherein the holding means is directly connected to a gearshift shaft, said toggling mechanism being in said second, bent position with said actuating pin in said retracted position.

12. A parking brake device in accordance with claim 8, wherein said holding means is connected to said adjusting means of said parking brake pawl via a cable or coupling linkage.

13. A parking brake device in accordance with claim 8, wherein the adjusting means of the parking brake device comprises a hydraulic actuator element, wherein the hydraulic actuator element is set up to disengage the parking brake pawl when oil pressure is admitted.

14. A parking brake device in accordance with claim 13, wherein a spring force is applied to the hydraulic actuator element by means of a spring-type brake actuator in the direction of the engaged parking brake pawl.

15. A parking brake device in accordance with claim 8, wherein said toggle mechanism further comprises an actuating lever, said actuating pin being opposite said point of articulation.

16. A parking brake device in accordance with claim 15, wherein said actuating lever, said first toggle mechanism portion and said second toggle mechanism portion define a first toggle mechanism arrangement with said parking brake pawl fixed in the disengaged position, said actuating pin being in said retracted position with said parking brake pawl fixed in the disengaged position, said actuating lever, said first mechanism toggle portion and said second mechanism toggle portion defining a second toggle mechanism arrangement with said parking brake pawl in said engaged position, said actuating lever being substantially perpendicular to said first mechanism toggle portion and said second mechanism toggle portion in said first toggle mechanism arrangement, said actuating lever being parallel to said actuating pin in said first toggle mechanism arrangement, said second mechanism toggle portion being parallel to said actuating pin in said second toggle mechanism arrangement.

17. A parking brake device in accordance with claim 1, wherein said toggle mechanism comprises an actuating lever, a connection leg and a support leg, said connection leg and said support leg forming a knee point in said area of articulation, said actuating pin being opposite said knee point.

18. A parking brake device in accordance with claim 17, wherein said actuating lever, said connection leg and said support leg define a first toggle mechanism arrangement with said parking brake pawl fixed in the disengaged position, said actuating pin being in said retracted position with said parking brake pawl fixed in the disengaged position, said actuating lever, said connection leg and said support leg defining a second toggle mechanism arrangement with said parking brake pawl in said engaged position, said actuating lever being substantially perpendicular to said connection leg and said support leg in said first toggle mechanism arrangement, said actuating lever being parallel to said actuating pin in said first toggle mechanism arrangement, said support leg being parallel to said actuating pin in said second toggle mechanism arrangement.

19. A parking brake device for motor vehicle automatic transmissions, the parking brake device comprising:
a parking brake pawl arrangement with a parking brake wheel, which when fixed, fixes a vehicle power train, a parking brake pawl movable between an engaged position, engaging the parking brake wheel to fix the parking brake wheel and a disengaged position and an adjusting means for engaging and disengaging the pawl from said parking brake wheel;
a holding means for securing the parking brake pawl in the disengaged position, said holding means comprising a toggle mechanism including a support leg and a connection leg that can be brought from a first, stretched position, in which the parking brake pawl is fixed in the disengaged position, into a second, bent position, in which the parking brake pawl can be engaged; and
an actuator element deflecting the support leg and said connection leg from the first, stretched position to the second, bent position upon said actuator element receiving an electronic signal, one or more of said support leg and said connection leg defining an articulation point, said actuator element comprising an actuating pin, said actuating pin being movable, relative to said toggling mechanism, between a retracted position and an extended position, wherein said actuating pin moves independent of movement of said toggling mechanism, said actuating pin being at a spaced location from said toggle mechanism in said retracted position, said actuating pin being detached from said toggling mechanism in said retracted position, said actuating pin moving from said retracted position to said extended position and said actuating pin moving from said extended position to said retracted position, after said actuating pin engages said toggle mechanism, upon said actuator element receiving the electronic signal, said actuating pin engaging said toggle mechanism at or adjacent to said articulation point in said extended position.

20. A parking brake device in accordance with claim 19, wherein said toggle mechanism further comprises an actuating lever, said actuating pin being opposite said articulation point, said actuating lever, said connection leg and said support leg defining a first toggle mechanism arrangement with said parking brake pawl fixed in the disengaged position, said actuating pin being in said retracted position with said parking brake pawl fixed in the disengaged position, said actuating lever, said connection leg and said support leg defining a second toggle mechanism arrangement with said parking brake pawl in said engaged position, said actuating lever being substantially perpendicular to said connection leg and said support leg in said first toggle mechanism arrangement, said connection leg being aligned with said support leg in said first toggle mechanism arrangement, said actuating lever being parallel to said actuating pin in said first toggle mechanism arrangement, said support leg being parallel to said actuating pin in said second toggle mechanism arrangement.

* * * * *